US011708013B2

(12) United States Patent
Ewehag et al.

(10) Patent No.: US 11,708,013 B2
(45) Date of Patent: Jul. 25, 2023

(54) VEHICLE SEAT ARRANGEMENT

(71) Applicant: Ningbo Geely Automobile Research & Development Co., Ltd., Ningbo (CN)

(72) Inventors: Oskar Ewehag, Gothenburg (SE); Johan Höcks, Varberg (SE); Christian Forsberg, Laholm (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/555,394

(22) Filed: Dec. 18, 2021

(65) Prior Publication Data

US 2022/0111767 A1 Apr. 14, 2022

Related U.S. Application Data

(63) Continuation of application No. PCT/CN2020/101385, filed on Jul. 10, 2020.

(30) Foreign Application Priority Data

Aug. 13, 2019 (EP) .................................... 19191576

(51) Int. Cl.
*B60N 2/20* (2006.01)
(52) U.S. Cl.
CPC .................................... *B60N 2/203* (2013.01)
(58) Field of Classification Search
CPC ....... B60N 2/203; B60N 2/143; B60N 2/1839
USPC ..................................................... 297/583.3
See application file for complete search history.

(56) References Cited

U.S. PATENT DOCUMENTS

| 6,991,285 | B1 | 1/2006 | Hemenway | |
| 7,281,761 | B2 * | 10/2007 | Brown | B60N 2/818 |
| | | | | 297/188.05 |
| 2003/0047974 | A1 * | 3/2003 | Tame | B60N 2/203 |
| | | | | 297/283.3 |
| 2004/0256894 | A1 | 12/2004 | McManus et al. | |
| 2005/0146186 | A1 | 7/2005 | Kinnou et al. | |
| 2005/0253433 | A1 | 11/2005 | Brown et al. | |

(Continued)

FOREIGN PATENT DOCUMENTS

| CN | 2470183 Y | 1/2002 |
| CN | 101309813 A | 11/2008 |

(Continued)

OTHER PUBLICATIONS

International Search Report from corresponding International Application No. PCT/CN2020/101385, dated Sep. 28, 2020, 2 pages.

*Primary Examiner* — Sarah B McPartlin
(74) *Attorney, Agent, or Firm* — Tucker Ellis LLP

(57) ABSTRACT

A vehicle seat arrangement includes a vehicle seat arranged to be adjusted between a forward facing setup and a rearward facing setup and a seat back rotation axle. A seat back is rotatable around a seat back rotation axle between a forward facing seat back setup and a rearward facing seat back setup. The seat cushion is arranged to be adjusted between a forward facing seat cushion setup and a rearward facing seat cushion setup. The seat back rotation axle may be arranged to be fixed in location and the seat cushion may be arranged to be displaceable horizontally or the seat back rotation axle may be arranged to be displaceable horizontally and the seat cushion may be arranged to be fixed in location.

20 Claims, 13 Drawing Sheets

(56) References Cited

U.S. PATENT DOCUMENTS

| | | | | |
|---|---|---|---|---|
| 2014/0138991 A1* | 5/2014 | Deimen | ................ | B64D 11/06 |
| | | | | 297/94 |
| 2015/0258955 A1* | 9/2015 | Jayasuriya | .............. | B60R 22/26 |
| | | | | 297/353 |
| 2021/0009015 A1* | 1/2021 | Vetere | .................... | B60N 2/203 |

FOREIGN PATENT DOCUMENTS

| | | |
|---|---|---|
| CN | 108407673 A | 8/2018 |
| CN | 110053524 A | 7/2019 |
| DE | 102012011505 A1 | 12/2013 |
| FR | 1030298 A | 6/1953 |
| FR | 2671530 A1 | 7/1992 |

* cited by examiner

VEHICLE SEAT ARRANGEMENT

RELATED APPLICATION DATA

This application is a continuation of International Patent Application No. PCT/CN2020/101385, filed Jul. 10, 2020, which claims the benefit of European Patent Application No. 19191576.8, filed Aug. 13, 2019, the disclosures of which are incorporated herein by reference in their entireties.

TECHNICAL FIELD

The invention relates to a vehicle seat arrangement comprising a vehicle seat, arranged to be adjusted between a forward facing setup and a rearward facing setup, and a seat back rotation axle. The vehicle seat comprises a seat back and a seat cushion, wherein the seat back is rotatable around the seat back rotation axle between a forward facing seat back setup and a rearward facing seat back setup. The seat cushion is arranged to be adjusted between a forward facing seat cushion setup and a rearward facing seat cushion setup.

BACKGROUND

Large vehicles such as sport utility vehicles, minivans or multi-purpose vehicles may have a third row of seats as compared to smaller vehicles that normally have two rows of seats. In some instances, it is useful to be able to adjust the second and/or the third row from a forward facing setup to a backward facing setup (and vice versa).

Many solutions on the market usually requires the user to disassemble the seat from the floor, bring it out of the vehicle, rotate it manually and then assemble it to the seat structure in the vehicle floor again. This makes changing the seat setup difficult and time consuming and may require the use of tools.

DE102012011505 A1 discloses a seat comprising a seat back and a seat cushion where the seat back is arranged to be displaceable relative the seat cushion via a guide device. The seat back is hinged and slidable relative to the seat cushion such that it can change the seat facing setup. Even though DE102012011505 A1 discloses a way to change the seat facing setup inside the vehicle, disadvantages still exist.

SUMMARY

An objective of the disclosure is to provide a vehicle seat arrangement. The objective is achieved by a vehicle seat arrangement comprising a vehicle seat arranged to be adjusted between a forward facing setup and a rearward facing setup and a seat back rotation axle. The vehicle seat comprises a seat back and a seat cushion, wherein the seat back is rotatable around the seat back rotation axle between a forward facing seat back setup and a rearward facing seat back setup and the seat cushion is arranged to be adjusted between a forward facing seat cushion setup and a rearward facing seat cushion setup. The seat back and seat cushion are arranged as two separate parts. The seat back rotation axle is arranged to be fixed in location during the seat back's rotation between the forward facing seat back setup and the rearward facing seat back setup, and the seat cushion is arranged to be displaceable horizontally between a first seat cushion location in which the seat cushion is arranged in the forward facing seat cushion setup and a second seat cushion location in which the seat cushion is arranged in the rearward facing seat cushion setup. Alternatively, the seat back rotation axle is arranged to be displaceable horizontally between a first seat back rotation axle location in which the seat back is arranged in the forward facing seat back setup and a second seat back rotation axle location in which the seat back is arranged in the rearward facing seat back setup and the seat cushion is fixed in location in both the forward facing seat back setup and the rearward facing seat back setup. The seat back and seat cushion are arranged to be movable independently of each other.

As described in DE102012011505 A1, it is advantageous from a user perspective to have a solution where the seat facing setup can be changed from the forward facing setup to the backward facing setup inside the vehicle. A vehicle seat arrangement according to the disclosure makes it possible to flip the seat inside the vehicle, without the need to remove it first. An advantage over DE102012011505 A1 is that the vehicle seat arrangement according to the disclosure provides a compact and simple vehicle seat arrangement with improved comfort. In DE102012011505 A1, the seat cushion does not change between the forward facing position and the rearward facing position, only the seat back. The vehicle seat arrangement according to the disclosure allows for both the seat back and the seat cushion to be placed in a forward facing setup and a rearward facing setup. This makes it possible to improve the comfort of the vehicle seat arrangement of the disclosure, since not changing the seat cushion facing setup as in DE102012011505 A1 requires a seat cushion that is adapted for both a forward facing setup and a rearward facing setup. This will lead to that the seat cushion is not suitably ergonomically adapted for the various facing setups as it has to function in both the forward facing setup and the rearward facing setup. This leads to a less comfortable seat.

That the seat back and the seat cushion are arranged as two separate parts enable two variations of the vehicle seat arrangement as described in the disclosure. In a first variation, the seat back rotation axle, and thereby the seat back, is arranged to be fixed in location horizontally, and the seat cushion is arranged to be displaceable horizontally between a first seat cushion location and a second seat cushion location. In the second variation, the seat back rotation axle, and thereby the seat back, is arranged to be displaceable horizontally between a first seat back rotation axle location and a second seat back rotation axle location and the seat cushion is fixed in location horizontally. The two variations achieve the same objective of providing a compact and simple vehicle seat arrangement and allow a vehicle manufacturer to use the variation that best suits a specific vehicle model.

The seat back may comprise a first headrest arranged to be attached to a first end of the seat back and a second headrest arranged to be attached to a second end of the seat back opposite the first end. The second headrest is arranged to be positioned underneath the seat cushion when the seat back is in the forward facing seat back setup and the first headrest is arranged to be positioned underneath the seat cushion when the seat back is in the rearward facing seat back setup.

With a first and second headrest attached to the respective first and second end of the seat back, user safety is improved. Further, that the first and second headrest are arranged to be positioned underneath the seat cushion while still being attached to the seat back when not in use, makes the transition between the forward facing setup and the rearward facing setup easier as the headrest is already in place for both facing setups.

The seat cushion in both the forward facing seat cushion set up and in the rearward facing seat cushion set up may be arranged at a seat cushion angle relative a vehicle floor.

This further improves the comfort of the vehicle seat arrangement as the seat cushion can be arranged at a seat cushion angle that is ergonomically sound for a user.

The seat cushion in the forward facing seat cushion set up may be arranged at a forward facing seat cushion angle relative a vehicle floor and the seat cushion in the rearward facing seat cushion set up is arranged at a rearward facing seat cushion angle relative the vehicle floor.

This makes it possible to adapt the angle at which the seat cushion is arranged relative the vehicle floor in the different facing setups. This can be useful if, for instance, the vehicle seat arrangement is used for persons of various sizes in the different facing setups, if a child seat is to be arranged in the vehicle seat arrangement in one facing setup or if the vehicle seat arrangement is to be used as a reclining vehicle seat arrangement.

A vehicle seat arrangement according to any one of the preceding claims, wherein the seat back and/or the seat cushion is symmetric.

In order to provide a seat back and/or seat cushion that is easy and less expensive to manufacture, they can be made symmetric. This may come at the expense of some comfort, but increases the range of vehicles that the vehicle seat arrangement can be installed in due to the reduced cost.

The vehicle seat may comprise a first bucket or captain's seat and a second bucket or captain's seat, wherein the first bucket or captain's seat comprises an outer armrest and an inner armrest and the second bucket or captain's seat comprises an outer armrest and an inner armrest, and the seat back rotation axle is arranged to run through the outer and inner armrests of the first and second bucket or captain's seats such that the first and second bucket or captain's seats can be rotated independently of each other.

The vehicle seat according to the disclosure can be made to fit various types of vehicle seats. Two examples of vehicle seats are bucket seats and captain's seats that each comprise an outer armrest and an inner armrest. By having the seat back rotation axle run through the armrests of each vehicle seat, each vehicle seat can be made to change facing setup independently of the other vehicle seats attached to the seat back rotation axle. This can be useful if only one person would like to change the facing setup of his or her seat.

The vehicle seat may comprise a bench seat.

As an alternative to bucket or captain's seats, the vehicle seat may be a bench seat. In this case, the entire bench seat, or a part of the bench seat if it is a split bench, is arranged to rotate in order to change its facing setup. Being able to use a bench seat in the seat arrangement makes it possible to adapt a vehicle with different types of seats depending on the customer's desired setup of the vehicle.

The seat back rotation axle is arranged to be attached to the vehicle body.

The seat back rotation axle can be arranged to be connected only to the seats themselves, or it can be arranged to be attached to the vehicle body. By connecting the seat back rotation axle to the vehicle body, additional stability can be provided to the vehicle seat arrangement.

The vehicle seat may be arranged in the first row of a vehicle. The vehicle seat may be arranged in the second row of a vehicle. The vehicle seat may be arranged in the third row of a vehicle.

The vehicle seat of the vehicle seat arrangement can be arranged at any location in a vehicle. Depending on which row the vehicle seat is installed, constraints on which of the two variations described above that can be used may exist. It is also conceivable that the vehicle seat arrangement can be used in even larger vehicles, such as buses, airplanes, helicopters, trains, ships, boats etc.

The invention also relates to a vehicle comprising a vehicle seat arrangement according to the above description.

DETAILED DESCRIPTION

Figure 1:
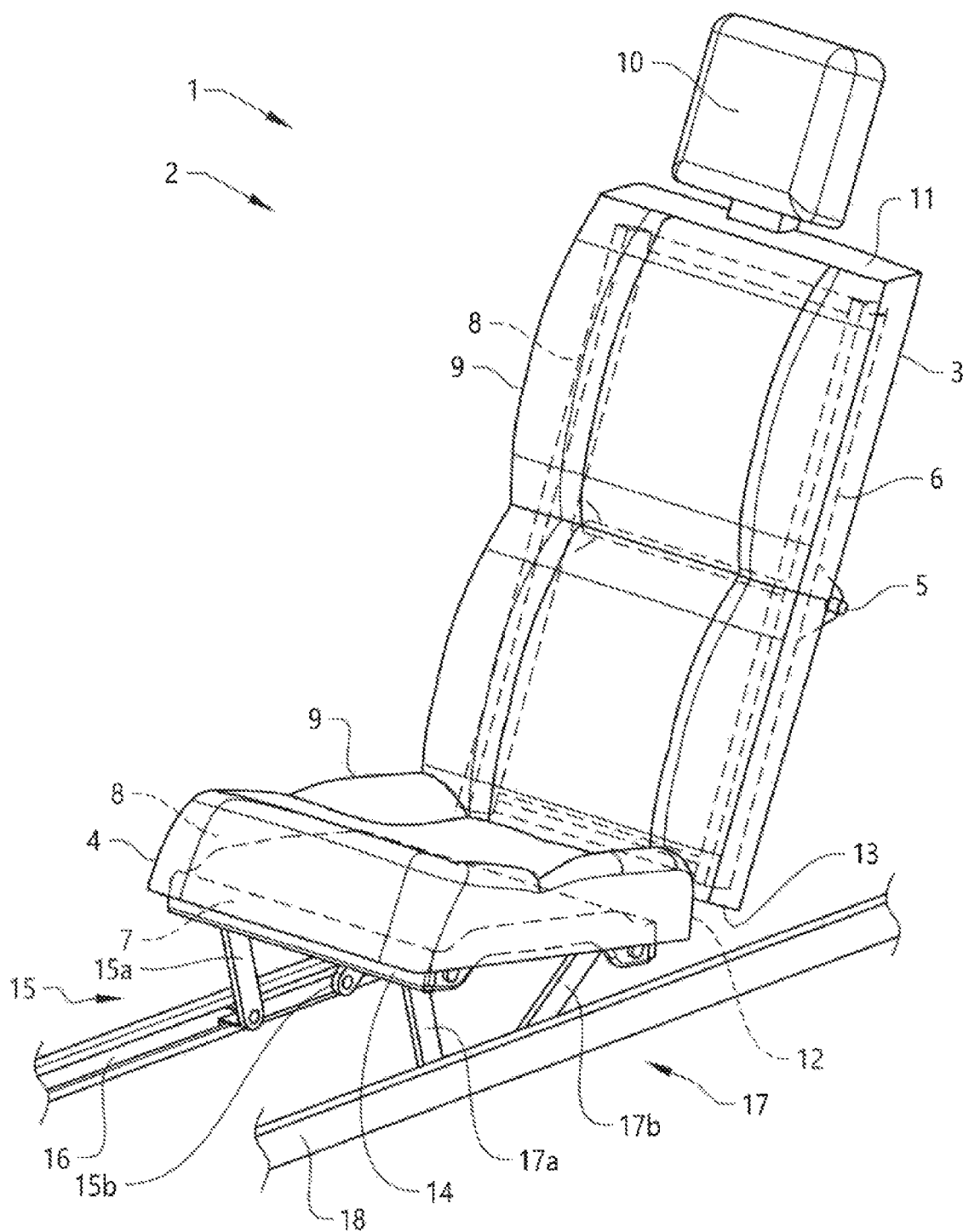
FIG. 1 schematically shows a perspective view of a vehicle seat arrangement according to a first variation, FIGS. 2A-2D schematically show a vehicle seat arrangement according to a first example embodiment of the first variation being adjusted between a forward facing setup and a rearward facing setup, FIGS. 3A-3D schematically show a vehicle seat arrangement according to a second example embodiment of the first variation being adjusted between a forward facing setup and a rearward facing setup, FIGS. 4A-4D schematically shows a vehicle seat arrangement according to a third example embodiment of the first variation being adjusted between a forward facing setup and a rearward facing setup, FIGS. 5A-5D schematically show a vehicle seat arrangement according to a first example embodiment of the second variation being adjusted between a forward facing setup and a rearward facing setup, FIGS. 6A-6D schematically show a vehicle seat arrangement according to a second example embodiment of the second variation being adjusted between a forward facing setup and a rearward facing setup, FIGS. 7A-7D schematically shows a vehicle seat arrangement according to a third example embodiment of the second variation being adjusted between a forward facing setup and a rearward facing setup.

FIG. 1 schematically shows a perspective view of a vehicle seat arrangement 1 according to a first example embodiment of a first variation. The vehicle seat arrangement 1 comprises a vehicle seat 2 comprising a seat back 3 and seat cushion 4 and a seat back rotation axle 5. The vehicle seat 2 is arranged to be adjusted between a forward facing setup and a rearward facing setup. With forward facing setup is meant that a user sitting in the vehicle seat 2 faces a forward direction towards the front of the vehicle or the vehicle's direction of travel. With rearward facing setup is meant that a user sitting in the vehicle seat 2 faces a rearward direction towards the rear of the vehicle or in a direction opposite of the vehicle's direction of travel. The seat back 3 is arranged on the seat back rotation axle 5 and is rotatable around the seat back rotation axle 5 between the forward facing seat back setup and the rearward facing seat back setup.

The seat back 3 comprises a seat back frame structure 6 covered with seat foam 8 that in turn is clad with a seat cover 9. Similarly, the seat cushion 4 comprises a seat cushion frame structure 7 covered with seat foam 8 that in turn is clad with a seat cover 9. Electronic controls and actuators can be installed to assist with the adjustment of the seat back 3 and/or the seat cushion 4. The vehicle seat 2 may also be fitted with seat belts or other safety equipment depending on national or regional regulations. The manufacturing of the various parts of the vehicle seat 2 is well known in the art.

The seat back rotation axle 5 is either directly attached to the seat back frame structure 6 or is arranged to be attached to the seat back frame structure 6. The seat back rotation axle 5 is arranged to be pivotably mounted in the vehicle, for instance on either side of the inside of the vehicle body facing a cabin of the vehicle. The seat back rotation axle 5 is attached at a height in the vehicle where the seat back 3 can easily be pivoted between the forward and rearward facing setup. Depending on the size of the seat and the type of vehicle, this height will vary.

The seat back 3 and the seat cushion 4 are separate from each other and can thus be moved independently of each other. The seat back 3 and seat cushion 4 can be made symmetric, i.e. that independent of the facing setup, the seat back 3 and seat cushion 4 will provide the user with the same comfort. The seat back 3 and the seat cushion 4 can also be adapted for one of the facing setups, which will lead to that the comfort in the facing setup for which the seat back 3 and seat cushion 4 is not adapted will be slightly less.

The seat back 3 of the vehicle seat 2 further comprises a first headrest 10 arranged to be rotatably attached to a first end 11 of the seat back 3 and a second headrest 12 arranged to be rotatably attached to a second end 13 of the seat back 3 opposite the first end 11. The second headrest 12 is arranged to be positioned underneath the seat cushion 4 when the seat back 3 is in the forward facing seat back setup and the first headrest 10 is arranged to be positioned underneath the seat cushion 4 when the seat back 3 is in the rearward facing seat back setup. The first headrest 10 and the second headrest 12 are arranged to be rotated between an upright state when the respective headrest 10, 12 is in use and a stowing state when the respective headrest 10, 12 is positioned underneath the seat cushion 4. This will be shown in more detail later.

The seat cushion frame structure 7 is attached to a seat cushion mount 14, which in FIG. 1 comprises a first seat cushion mounting arrangement 15 arranged to be rotatably attached to the seat cushion frame structure 7 and arranged to be movably attached to a first seat adjuster 16 and a second seat cushion mounting arrangement 17 arranged to be rotatably attached to the seat cushion frame structure 7 and arranged to be movably attached to a second seat adjuster 18. This allows the seat cushion 4 to be moved between a forward facing seat cushion setup and a rearward facing seat cushion setup. The first and second seat adjusters 16, 18 are arranged to be attached to the floor of the vehicle and can be of any kind known in the art. The first seat cushion mounting arrangement 15 comprises a first forward mounting mean 15a and a first rearward mounting mean 15b. The second seat cushion mounting arrangement 17 comprises a second forward mounting mean 17a and a second rearward mounting mean 17b.

The vehicle seat arrangement 1 can be arranged in two different variations. In the first variation, the seat back rotation axle 5, and thereby the seat back 3, is arranged to be fixed in location horizontally during the seat back's 3 rotation between the forward facing seat back setup and the rearward facing seat back setup. The seat cushion 4 is arranged to be displaceable horizontally between a first seat cushion location in which the seat cushion 4 is arranged in the forward facing seat cushion setup and a second seat cushion location in which the seat cushion 4 is arranged in the rearward facing seat cushion setup.

In the second variation, the seat back rotation axle 5, and thereby the seat back 3, is arranged to be displaceable horizontally between a first seat back rotation axle location in which the seat back 3 is arranged in the forward facing seat back setup and a second seat back rotation axle location in which the seat back 3 is arranged in the rearward facing seat back setup. The seat cushion 4 is fixed in location horizontally in both the forward facing seat back setup and the rearward facing seat back setup.

FIGS. 2A-2D schematically show a vehicle seat arrangement 1 according to a first example embodiment of the first variation being adjusted between a forward facing setup and a rearward facing setup.

Figure 2A:
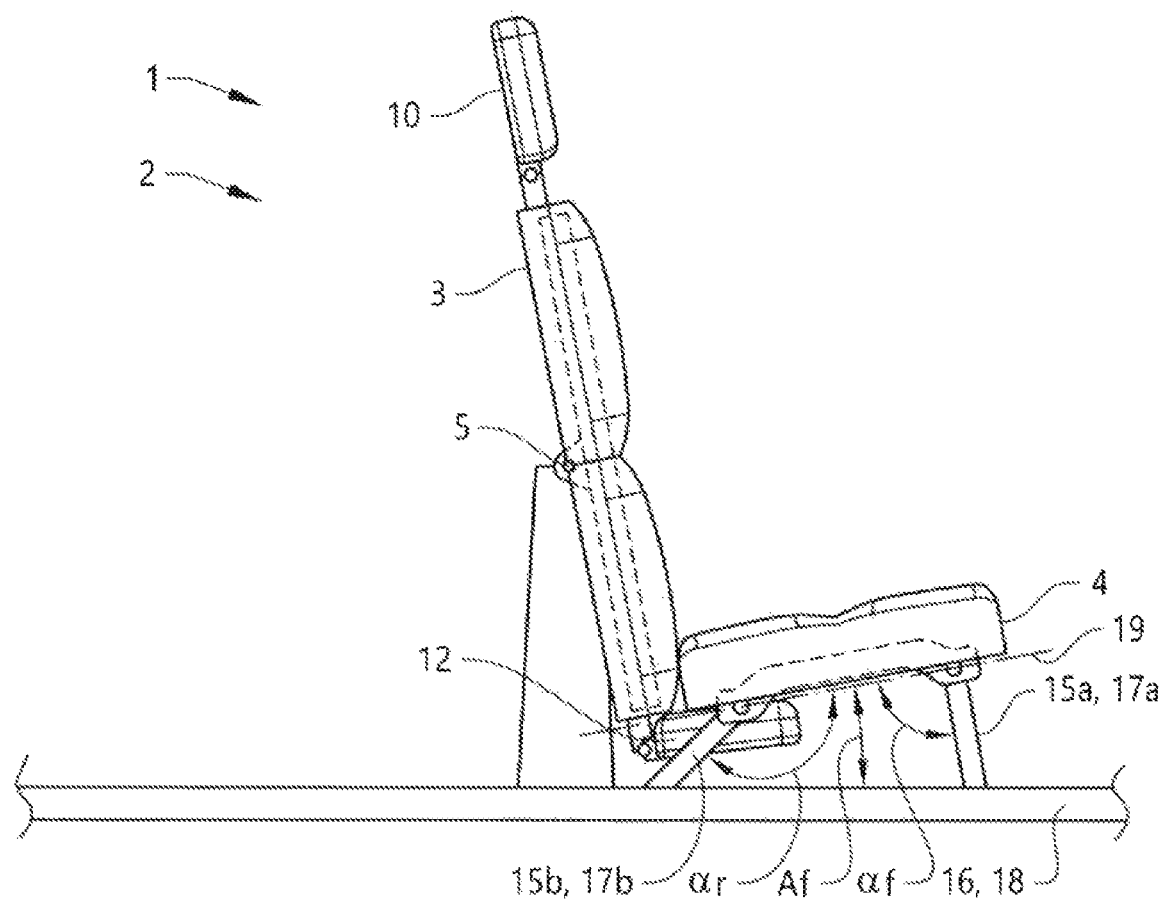

In FIG. 2A, the vehicle seat arrangement 1 is in the forward facing setup, i.e. the vehicle's direction of travel is to the right in FIG. 2A. This applies to all of the following figures. The seat cushion 4 is in its first seat cushion location. As can be seen, the first headrest 10 is arranged in an upright state while the second headrest 12 is arranged underneath the seat cushion 4 in a stowing state. The first and second head rests 10, 12 are arranged to be pivotably attached to the seat back 3 such that they can transition between the upright state and the stowing state.

In the first example embodiment, the first and second forward and rearward mounting means 15a, 15b, 17a, 17b are, over the course of the transition between the forward facing seat cushion setup and the rearward facing seat cushion setup, arranged at a first angle $\alpha$ essentially equal to or greater than 90° relative a seat cushion plane 19 passing through first forward and rearward mounting points of the first seat cushion mounting arrangement 15 and through second forward and rearward mounting points of the second seat cushion mounting arrangement 17. A forward first angle of is measured from the seat cushion plane 19 towards the rearward most part of the first forward mounting mean 15a and a rearward first angle $\alpha r$ is measured from the seat cushion plane 19 towards the forward most part of the first rearward mounting mean 15b and similarly for the second forward and rearward mounting means 17a, 17b.

Further, the seat cushion 4 itself is arranged at a forward facing seat cushion angle Af relative the floor of the vehicle as measured from the seat cushion plane 19. The forward facing seat cushion angle Af is approximately 7.5° to 12.5°. This applies to all embodiments.

Figure 2B:
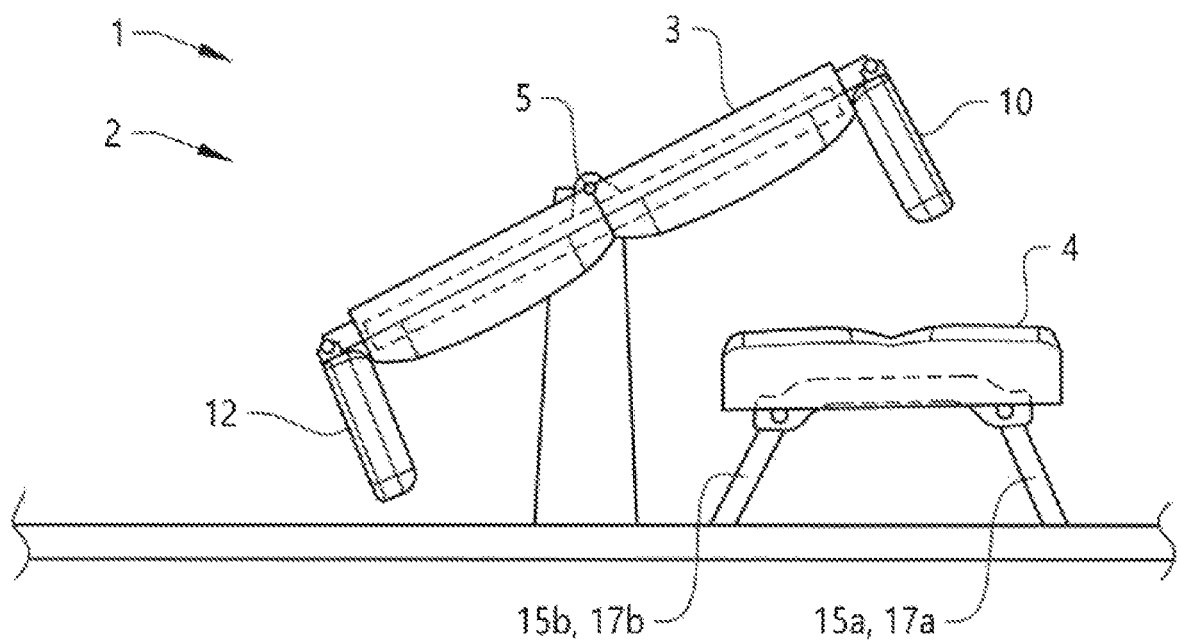

In FIG. 2b, the first headrest 10 has been moved to a stowing state in order to prepare for the headrest to be positioned underneath the seat cushion 4. The seat back 3 has begun to rotate round the seat back rotation axle 5 from the forward facing setup towards the rearward facing setup. The seat cushion 4 has been raised to an essentially level position in order to simplify for it to be displaced horizontally to its second seat cushion location.

Figure 2C:
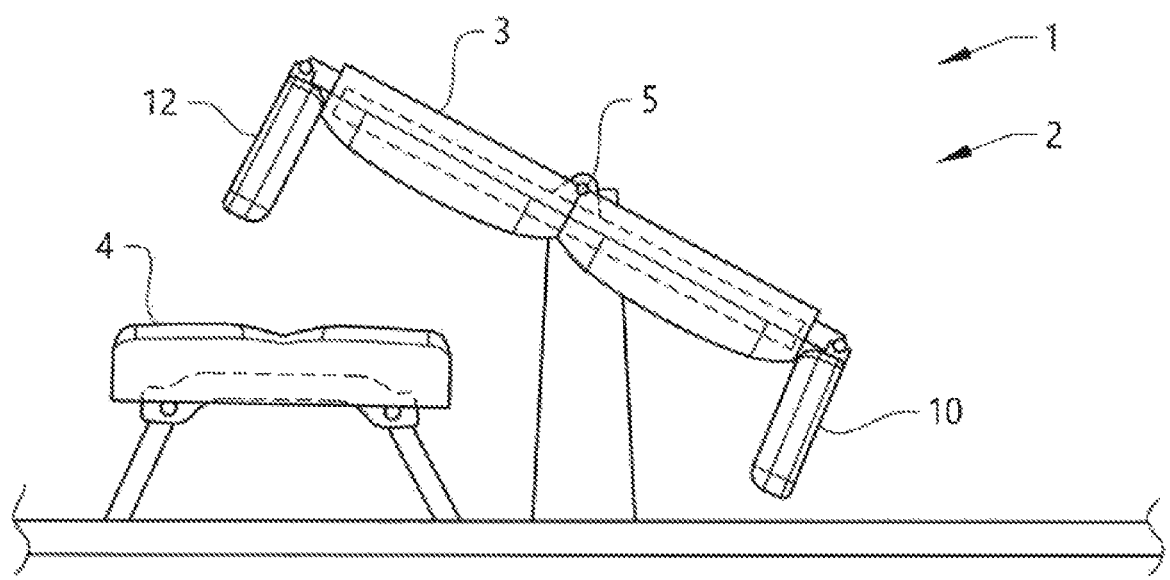

In FIG. 2C, the seat cushion 4 has been displaced horizontally to its second seat cushion location and the seat back 3 has rotated further towards the rearward facing seat back setup. The seat cushion 4 has started its transition to its rearward facing seat cushion setup.

Figure 2D:
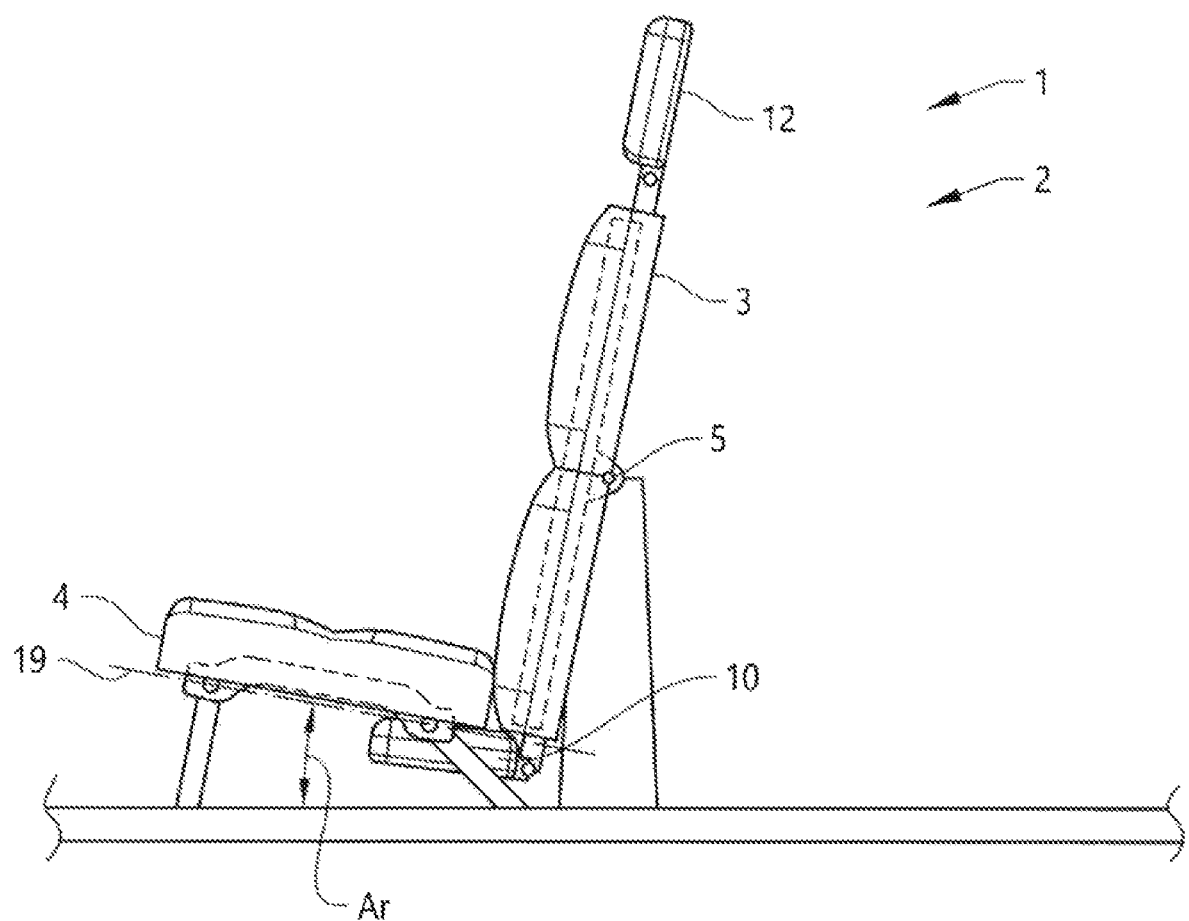
Figure 3A:
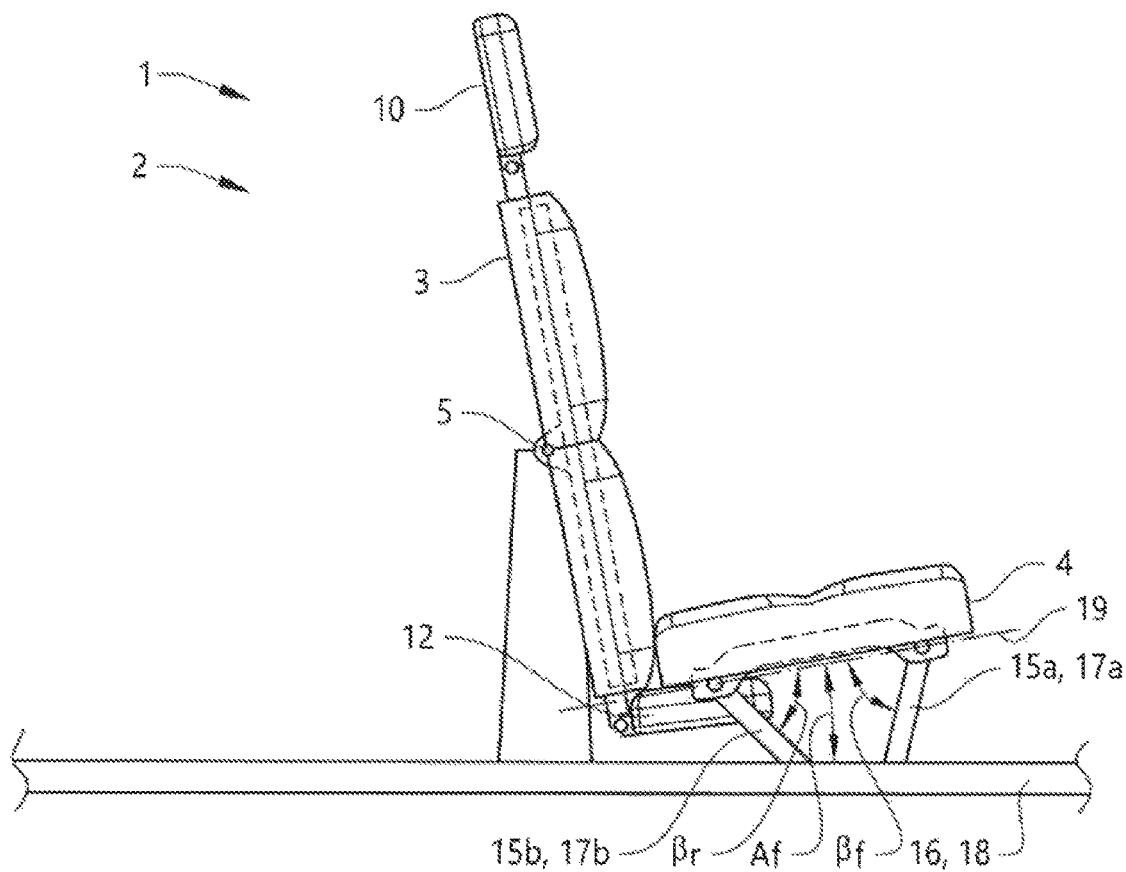
Figure 3B:
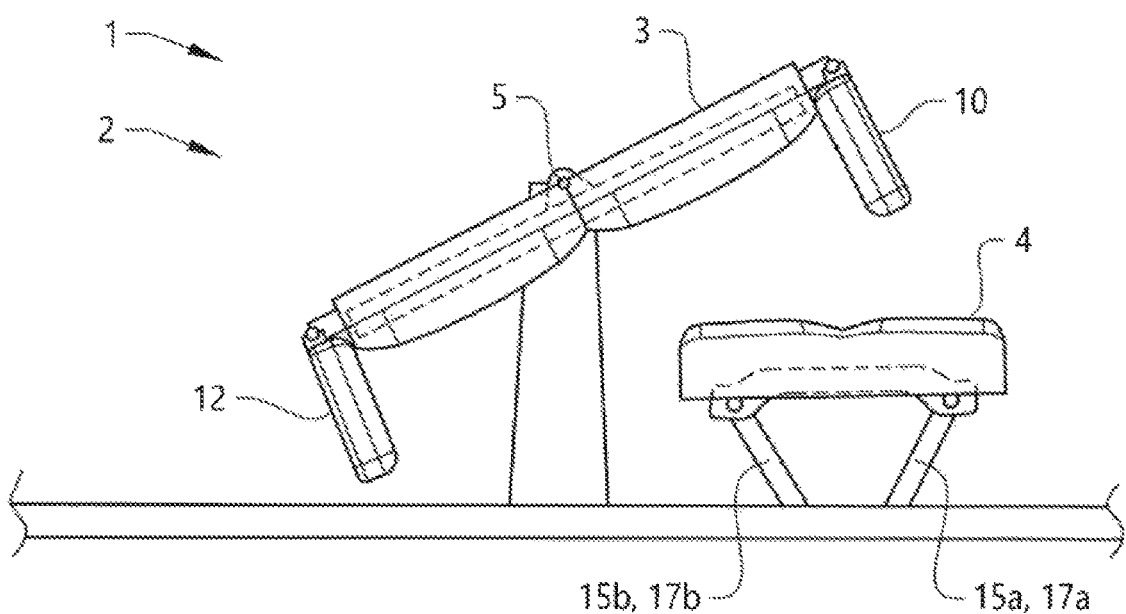
Figure 3C:
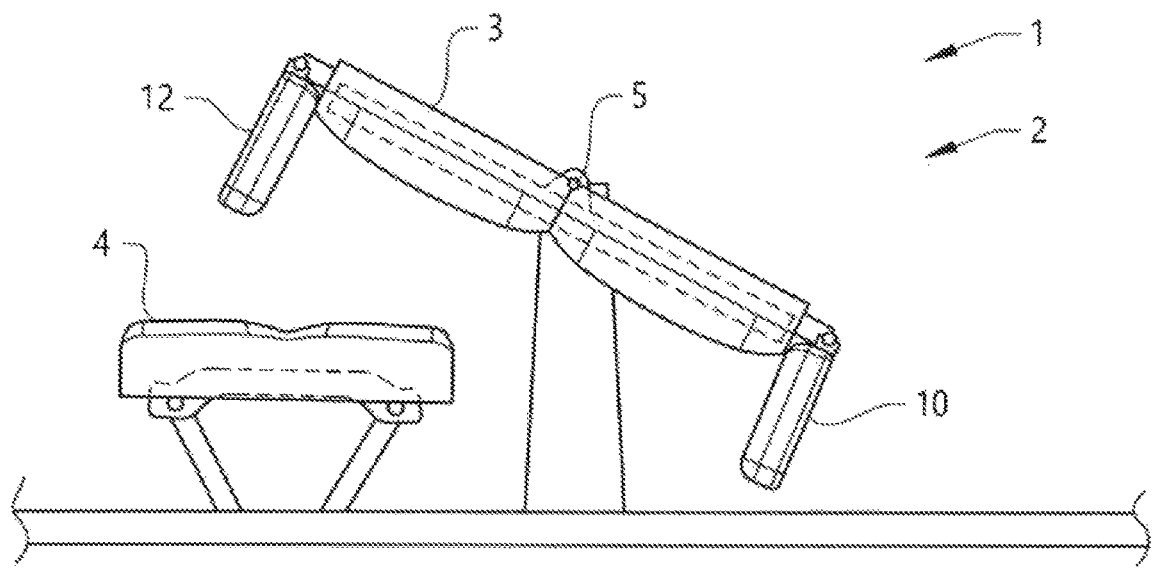
Figure 3D:
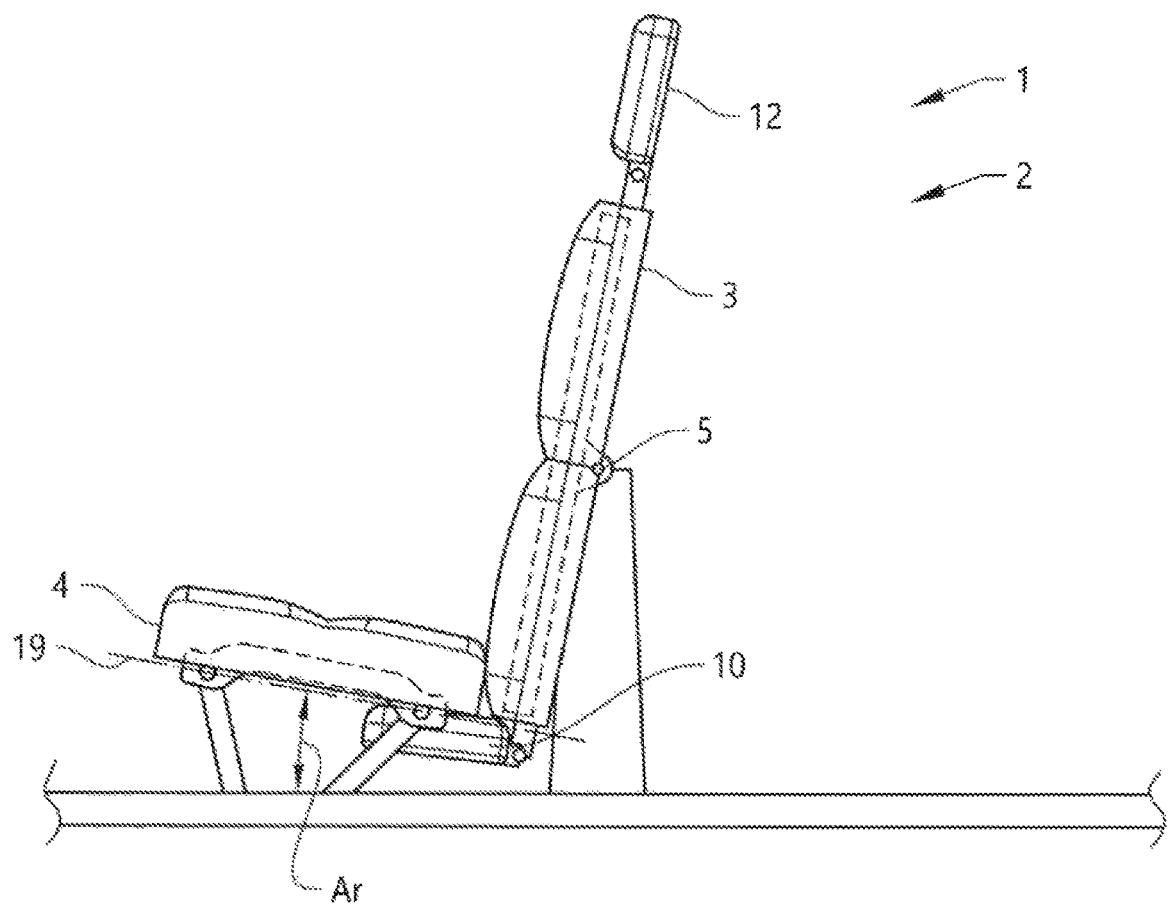

In FIG. 2D, the seat cushion 4 has been arranged in its rearward facing seat cushion setup, wherein the seat cushion 4 is arranged at rearward facing seat cushion angle Ar relative the floor of the vehicle. That the seat cushion 4 is arranged at the angle Ar in the rearward facing seat cushion setup increases the comfort of the vehicle seat arrangement 1. The rearward facing seat cushion angle Ar is approximately 7.5° to 12.5° and can be the same as or be different from the forward facing seat cushion angle Af. This applies also to the examples below.

The seat back 3 has been rotated completely to its rearward seat back facing setup with the second headrest 12 is arranged in an upright state and the first headrest 10 is positioned underneath the seat cushion 4 in its stowing state. This completes the transition between the forward facing setup and the rearward facing setup of the vehicle seat 2 of the vehicle seat arrangement 1.

FIGS. 3A-3D schematically show a vehicle seat arrangement 1 according to a second example embodiment of the first variation being adjusted between a forward facing setup and a rearward facing setup.

In the second example embodiment, the first and second forward and rearward mounting means 15a, 15b, 17a, 17b are, over the course of the transition between the forward facing setup and the rearward facing setup, arranged at a second angle β essentially smaller than 90° relative a seat cushion plane 19 passing through first forward and rearward mounting points of the first seat cushion mounting arrangement 15 and through second forward and rearward mounting points of the second seat cushion mounting arrangement 17. The second angle β is measured from the seat cushion plane 19 towards the rearward most part of the first forward mounting mean 15a and from the seat cushion plane 19 towards the forward most part of the first rearward mounting mean 15b and similarly for the second forward and rearward mounting means 17a, 17b.

Otherwise, the transition of the vehicle seat 2 between the forward facing setup and the rearward facing setup in FIGS. 3A-3D correspond to the transition of the vehicle seat 2 between the forward facing setup and the rearward facing setup in FIGS. 2A-2D.

FIGS. 4A-4D schematically shows a vehicle seat arrangement 1 according to a third example embodiment of the first variation being adjusted between a forward facing setup and a rearward facing setup.

In the third example embodiment, the first seat cushion mounting arrangement 15 comprises a first mounting base 15c and the second seat cushion mounting arrangement 17 comprises a second mounting base 17c. The seat cushion 4 is arranged to be rotatably attached to the first and second mounting bases 15c, 17c. The first and second mounting bases 15c, 17c are arranged to be movably attached to the first and second seat adjusters 16, 18 respectively. Tilting arrangements (not shown) on each of the first and second mounting bases 15c, 17c ensure that the seat cushion 4 will be arranged in the forward facing seat cushion angle Af and the rearward facing seat cushion angle Ar relative the floor of the vehicle respectively.

Figure 4A:
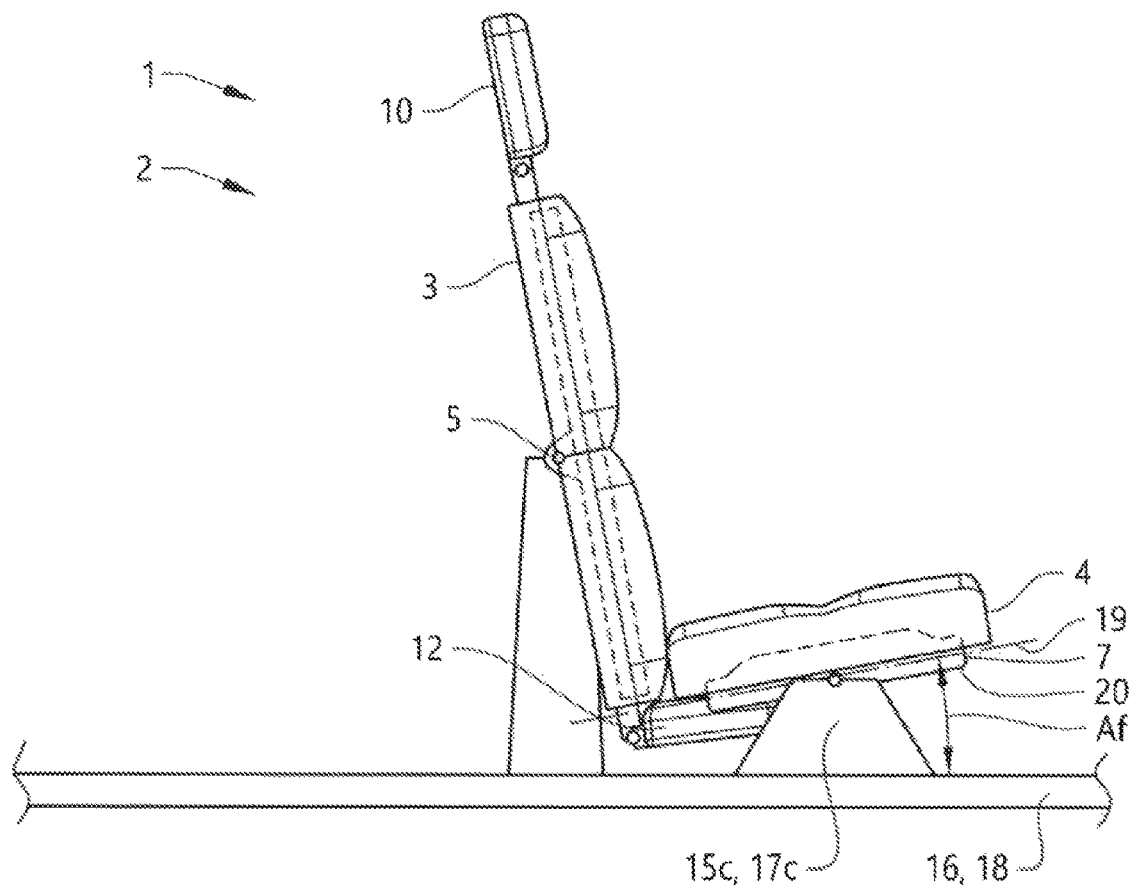
Figure 4B:
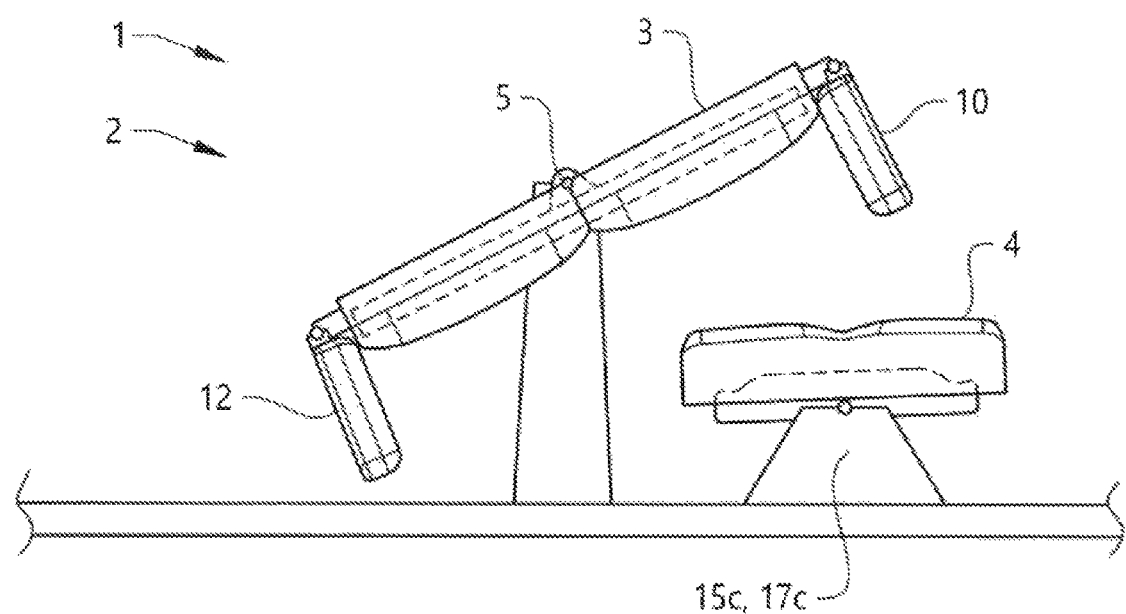
Figure 4C:
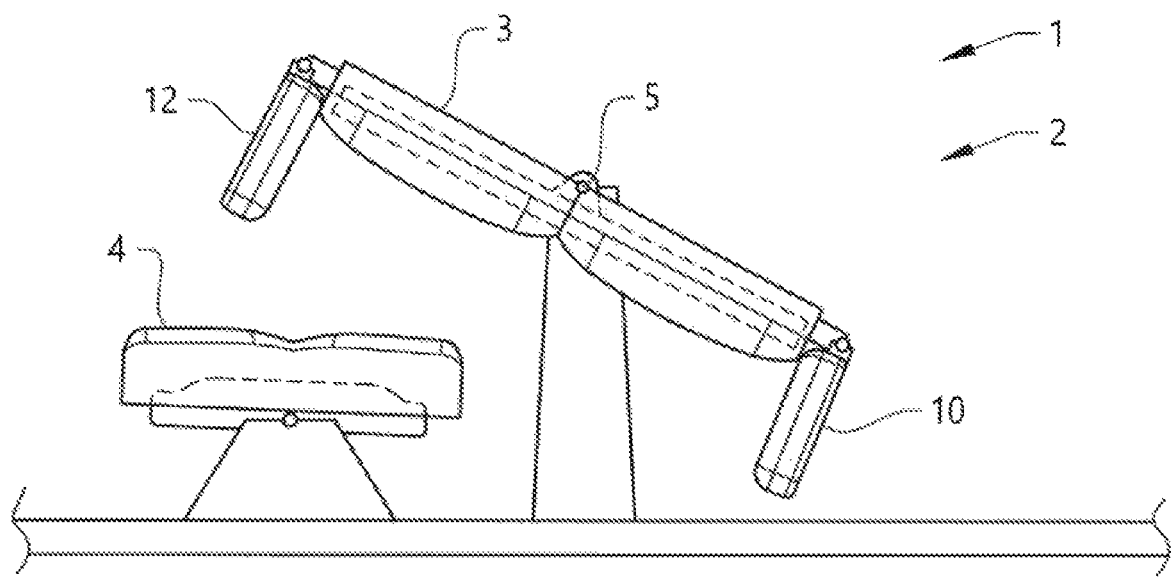
Figure 4D:
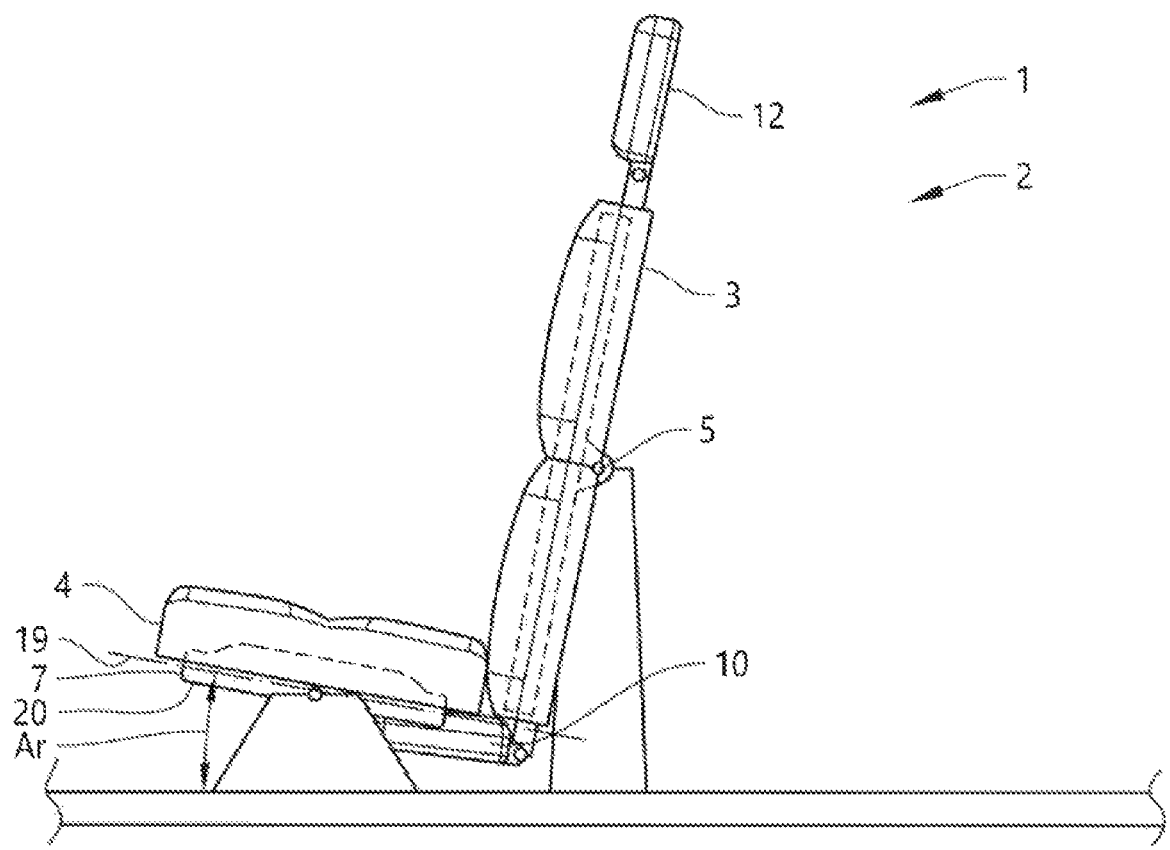

In FIGS. 4A and 4D, the angles Af and Ar are measured from a lower side 20 of the seat cushion frame structure 7.

Otherwise, the transition of the vehicle seat 2 between the forward facing setup and the rearward facing setup in FIGS. 4A-4D correspond to the transition of the vehicle seat 2 between the forward facing setup and the rearward facing setup in FIGS. 2A-2D.

FIGS. 5A-5D schematically show a vehicle seat arrangement 1 according to a first example embodiment of the second variation being adjusted between a forward facing setup and a rearward facing setup. As mentioned above, in the second variation, the seat back rotation axle 5, and thereby the seat back 3, is arranged to be displaceable horizontally between a first seat back rotation axle location and a second seat back rotation axle location and the seat cushion 4 is fixed in location.

Figure 5A:
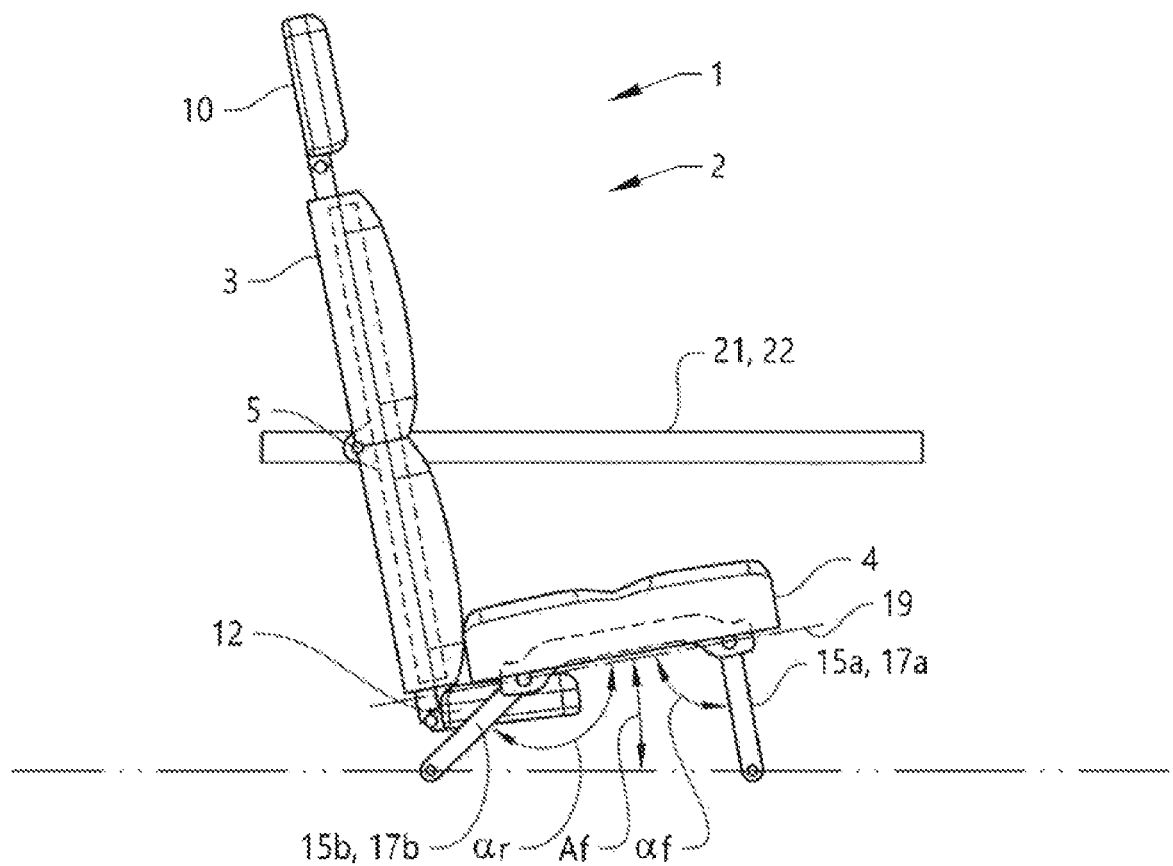

In FIG. 5A, the seat back rotation axle 5 is arranged to be movable horizontally, or displaceable horizontally, in a first and second seat back adjuster 21, 22. Only the second seat back adjuster 22 is shown in FIGS. 5A-5D. The first and second seat back adjusters 21, 22 can be similar to a seat adjuster and may be of various kinds known in the art. The seat back rotation axle can be movably attached to the first and second seat back adjusters 21, 22 in a similar way as the first forward mounting mean 15a, the first rearward mounting mean 15b, the second forward mounting mean 17a, the second rearward mounting mean 17b, the first mounting base 15c and the second mounting base 17c are attached to the first and second seat adjusters 16, 18 respectively. The length of the seat back adjusters 21, 22 are dependent on the type of vehicle in which the vehicle seat arrangement 1 is installed.

In the first example embodiment, also in the second variation, the first and second forward and rearward mounting means 15a, 15b, 17a, 17b are, over the course of the transition between the forward facing seat cushion setup and the rearward facing seat cushion setup, arranged at a first angle α essentially equal to or greater than 90° relative a seat cushion plane 19 passing through first forward and rearward mounting points of the first seat cushion mounting arrangement 15 and through second forward and rearward mounting points of the second seat cushion mounting arrangement 17. The first angle α is measured from the seat cushion plane 19 towards the rearward most part of the first forward mounting mean 15a and from the seat cushion plane 19 towards the forward most part of the first rearward mounting mean 15b and similarly for the second forward and rearward mounting means 17a, 17b.

Further, the seat cushion 4 itself is arranged at the forward facing seat cushion angle Af relative the floor of the vehicle.

Figure 5B:
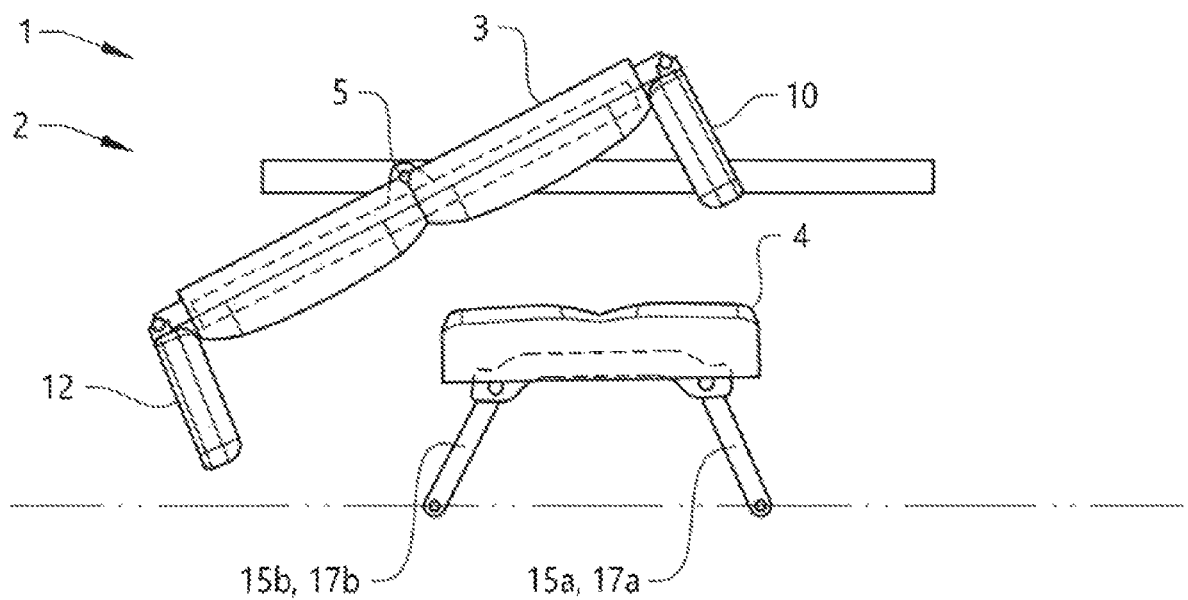

In FIG. 5B, the first headrest 10 has been moved to the stowing state in order to prepare for the headrest to be positioned underneath the seat cushion 4. The seat back 3 has begun to rotate round the seat back rotation axle 5 from the forward facing setup towards the rearward facing setup. The seat cushion 4 has been raised to an essentially level position in order to start the transition to the rearward facing seat cushion setup.

Figure 5C:
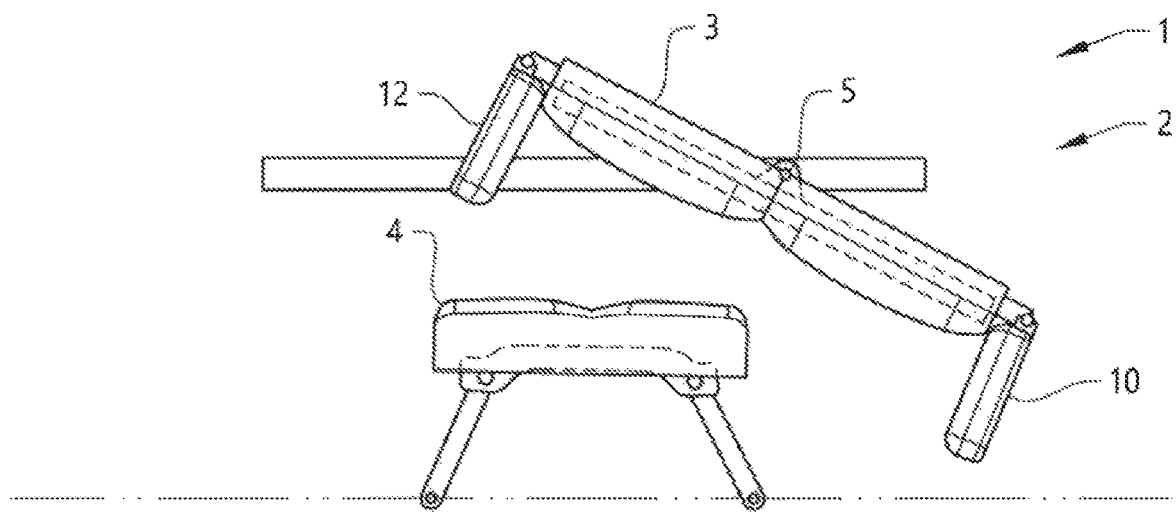

In FIG. 5C, the seat back 3 has been displaced horizontally to its second back location and the seat back 3 has rotated further towards the rearward facing seat back setup.

Figure 5D:
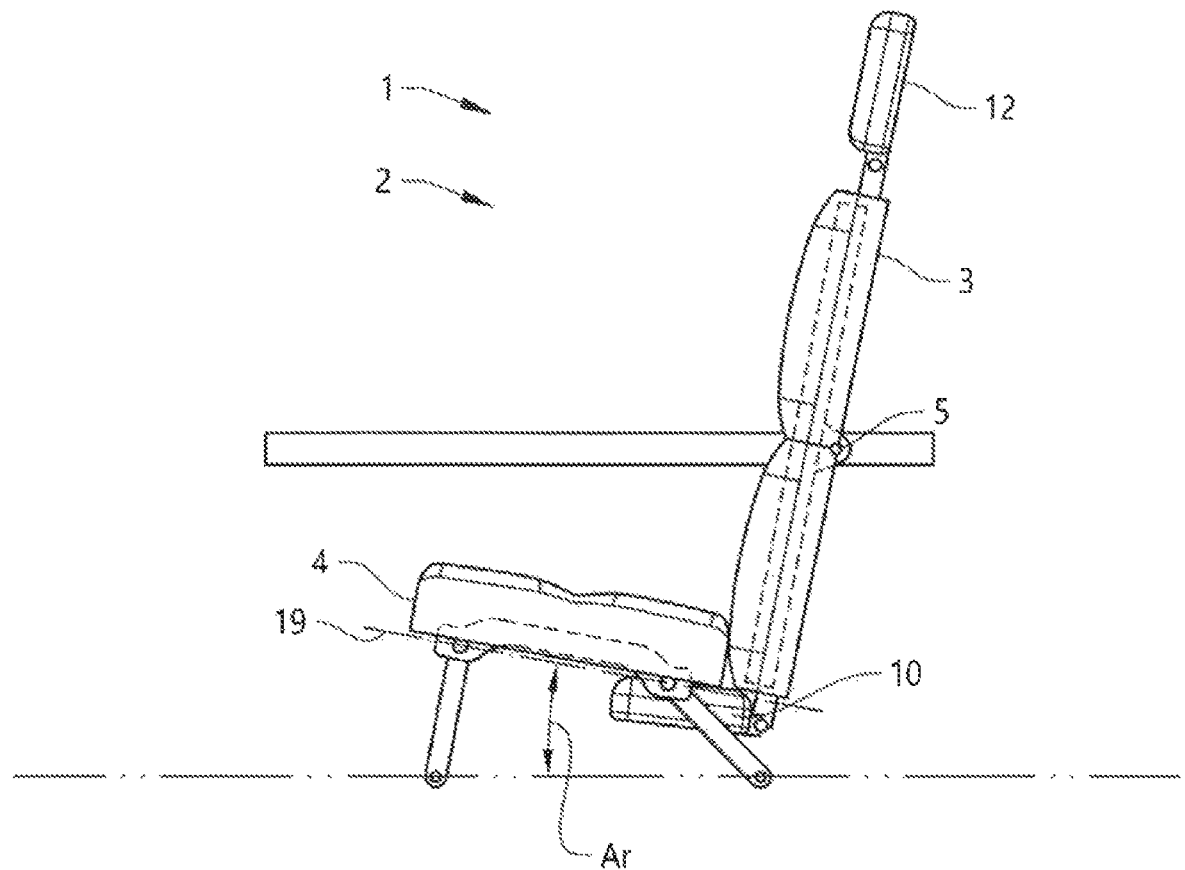
Figure 6A:
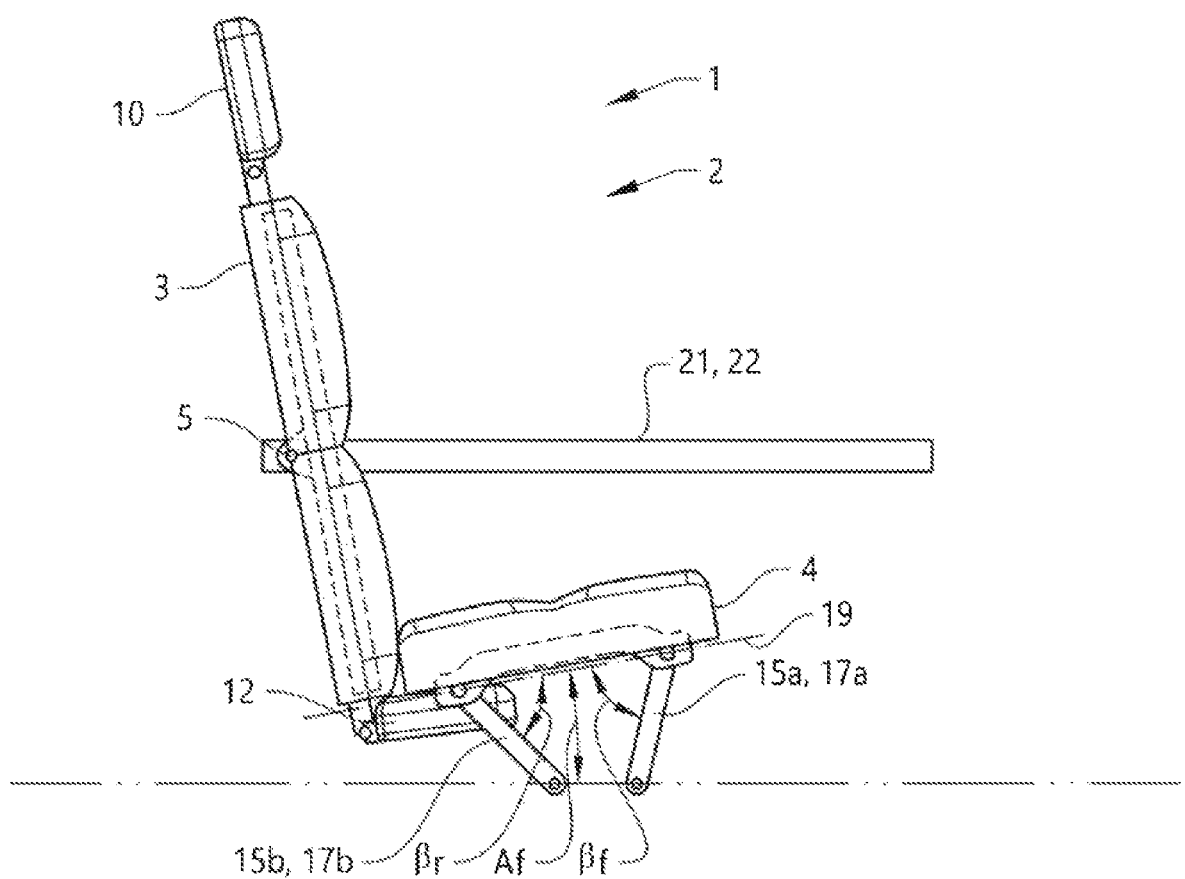
Figure 6B:
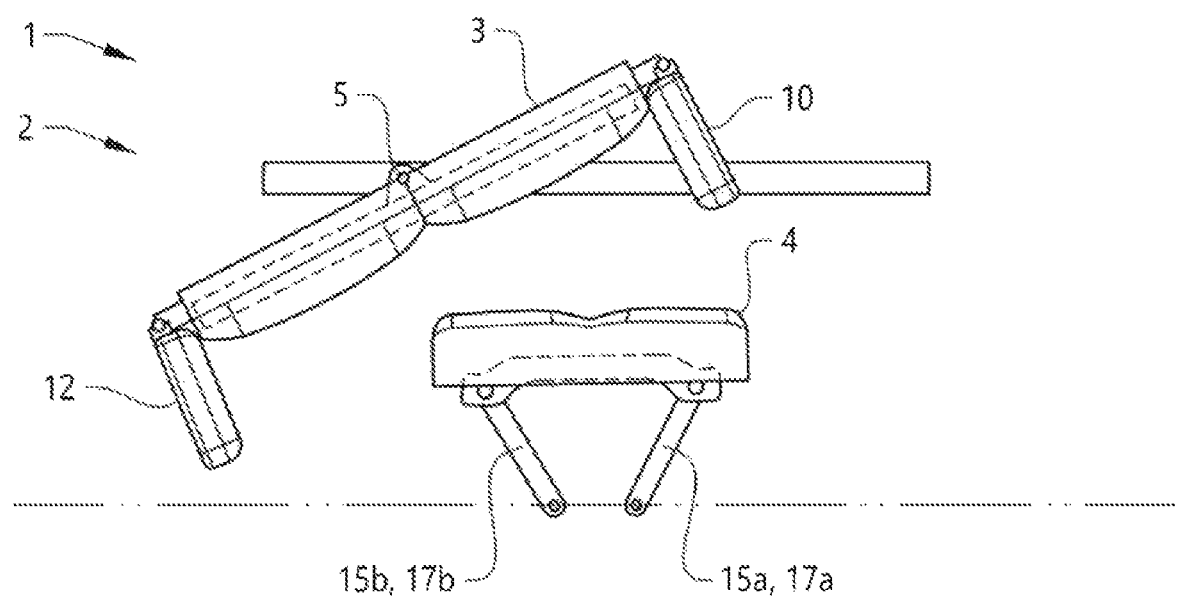
Figure 6C:
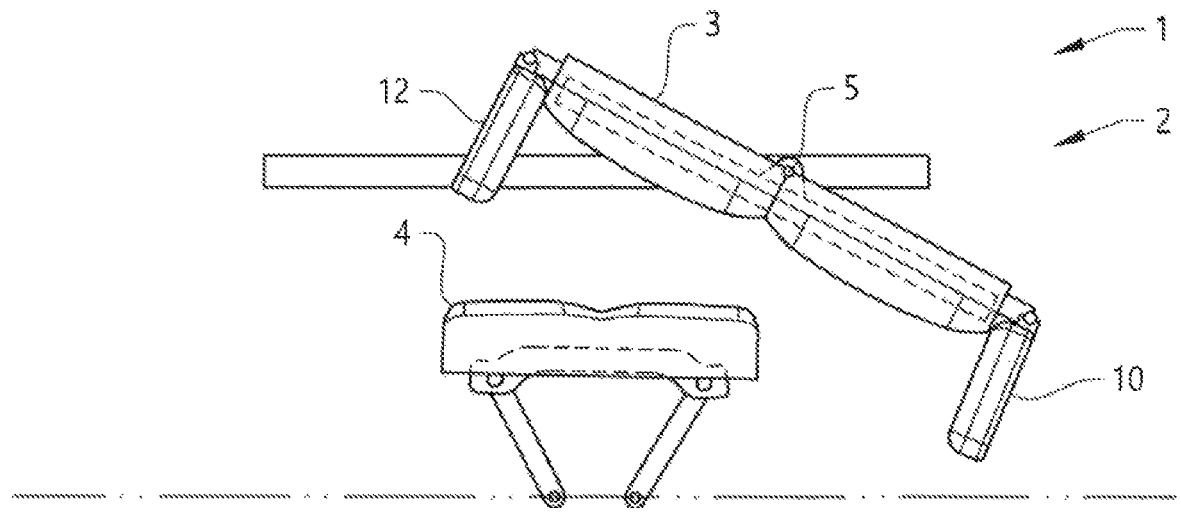
Figure 6D:
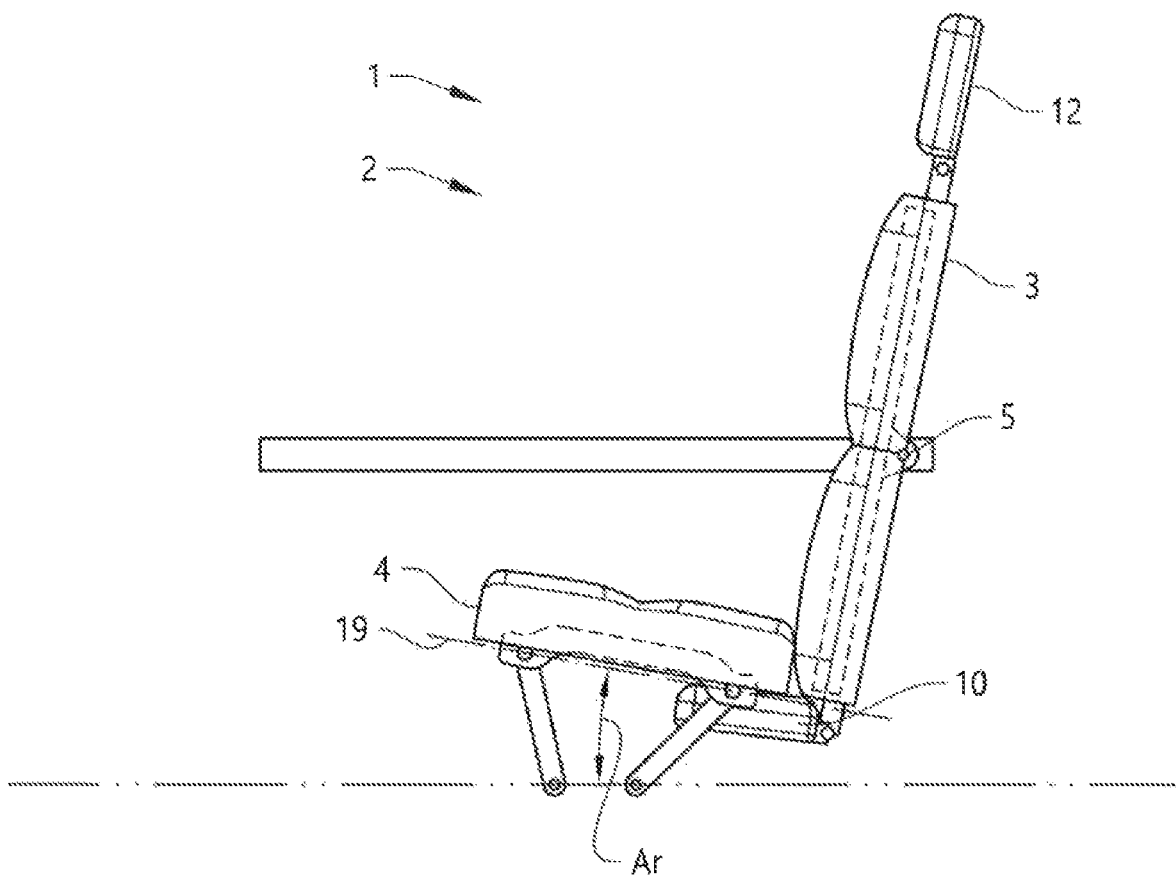
Figure 7A:
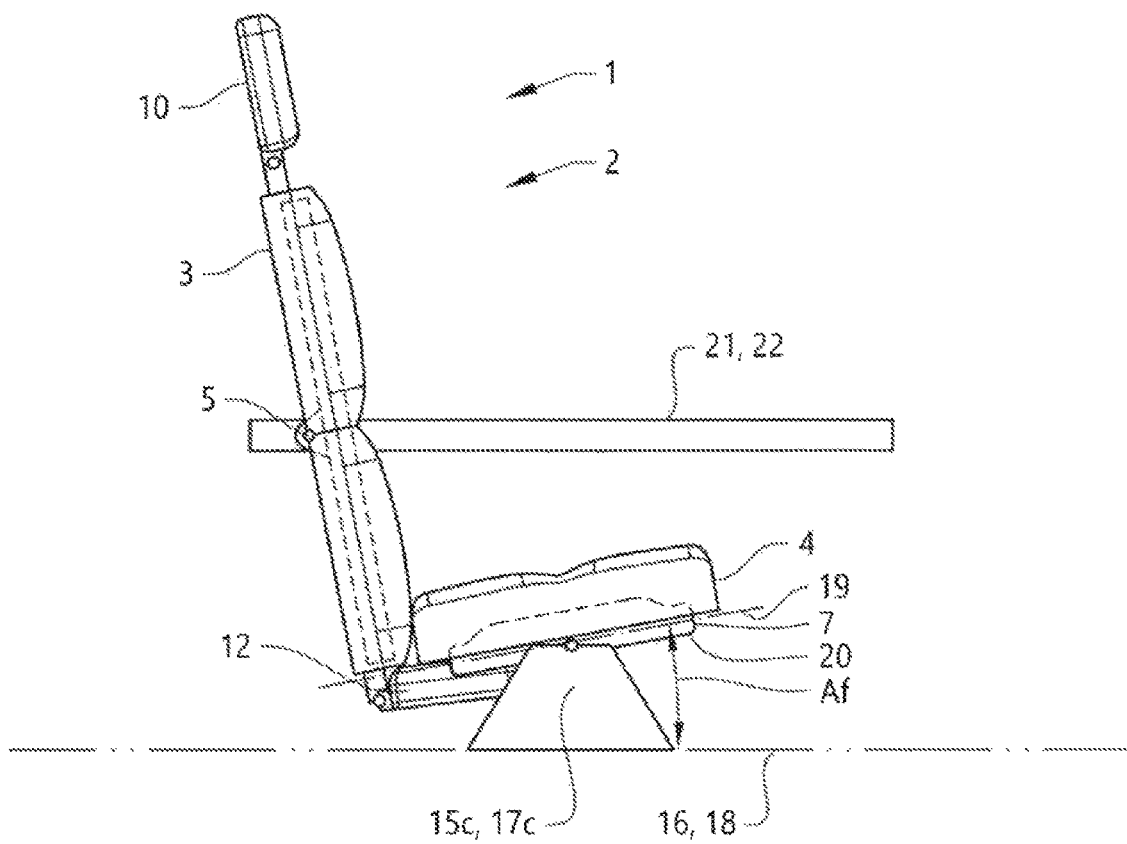
Figure 7B:
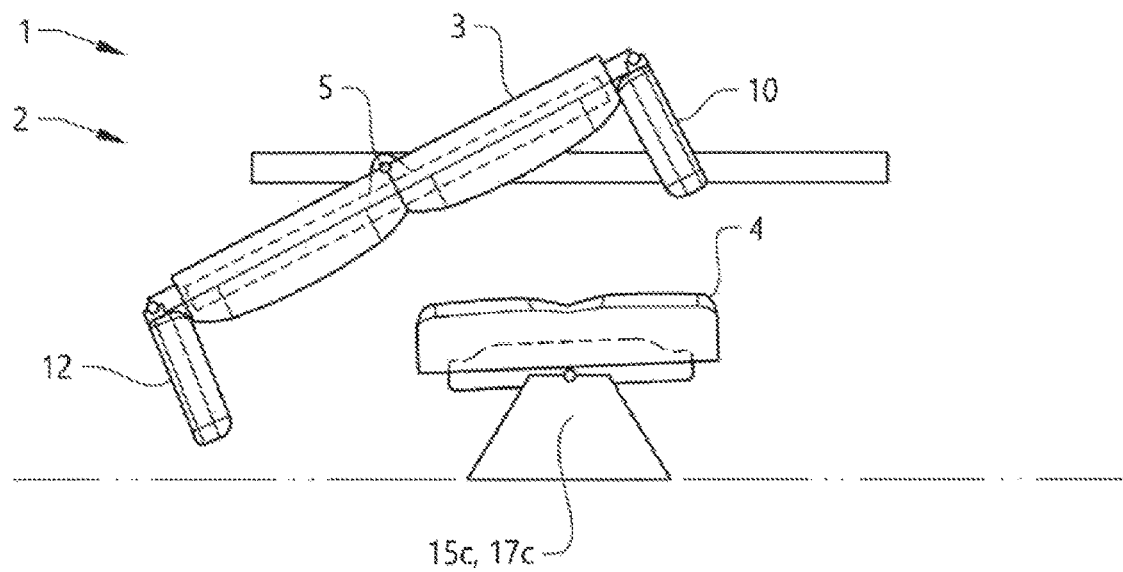
Figure 7C:
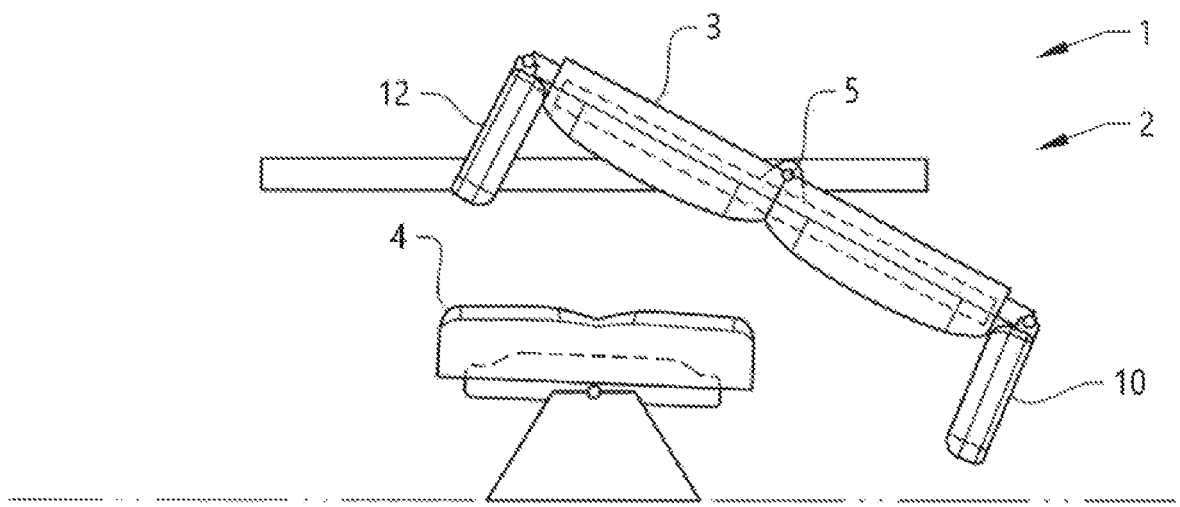
Figure 7D:
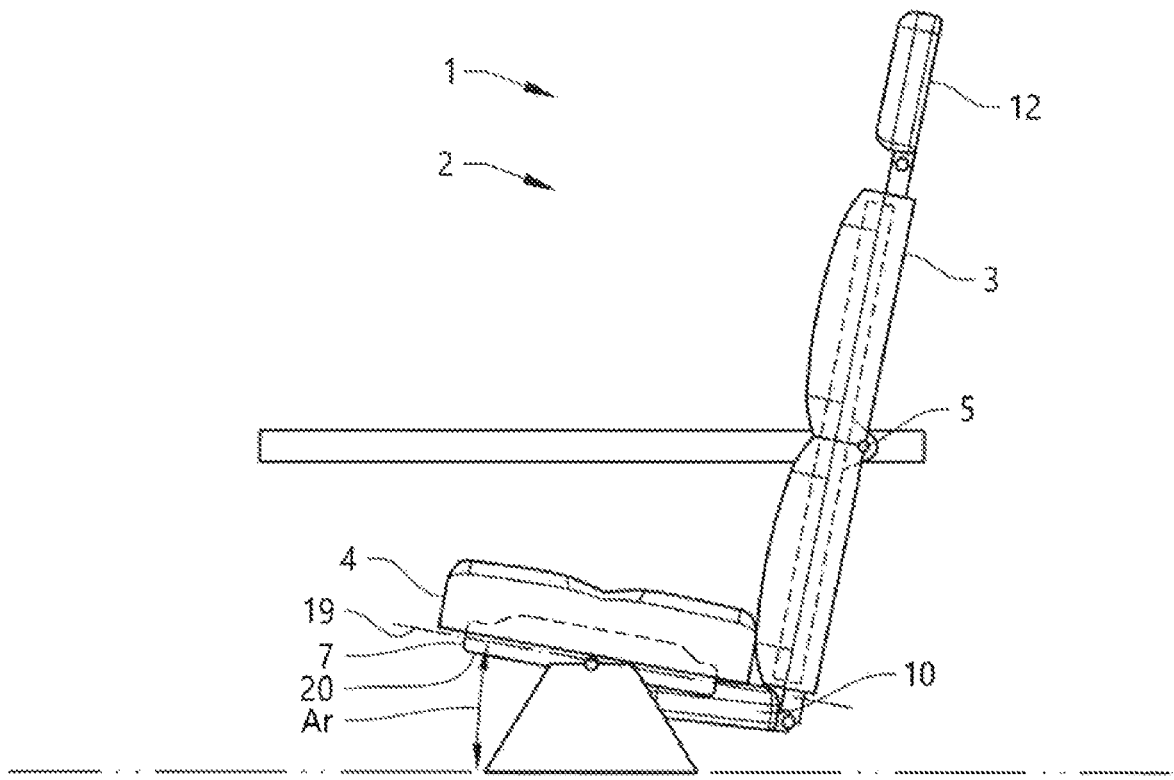

In FIG. 5D, the seat cushion 4 has been arranged in its rearward facing seat cushion setup, wherein the seat cushion 4 is arranged at rearward facing seat cushion angle Ar relative the floor of the vehicle. That the seat cushion 4 is arranged at the angle Ar in the rearward facing seat cushion setup increases the comfort of the vehicle seat arrangement 1.

The seat back 3 has been rotated completely to its rearward seat back facing setup with the second headrest 12 is arranged in an upright state and the first headrest 10 is positioned underneath the seat cushion 4 in its stowing state. This completes the transition between the forward facing setup and the rearward facing setup of the vehicle seat 2 of the vehicle seat arrangement 1.

FIGS. 6A-6D schematically show a vehicle seat arrangement 1 according to a second example embodiment of the second variation being adjusted between a forward facing setup and a rearward facing setup.

In the second example embodiment, the first and second forward and rearward mounting means are 15a, 15b, 17a, 17b, over the course of the transition between the forward facing setup and the rearward facing setup, arranged at a second angle β essentially smaller than 90° relative a seat cushion plane 19 passing through first forward and rearward mounting points of the first seat cushion mounting arrangement 15 and through second forward and rearward mounting points of the second seat cushion mounting arrangement 17. The second angle β is measured from the seat cushion plane 19 towards the rearward most part of the first forward mounting mean 15a and from the seat cushion plane 19 towards the forward most part of the first rearward mounting mean 15b and similarly for the second forward and rearward mounting means 17a, 17b.

Otherwise, the transition of the vehicle seat arrangement 1 between the forward facing setup and the rearward facing setup in FIGS. 3A-3D correspond to the transition of the vehicle seat 2 between the forward facing setup and the rearward facing setup in FIGS. 5A-5D.

FIGS. 7A-7D schematically shows a vehicle seat arrangement 1 according to a third example embodiment of the second variation being adjusted between a forward facing setup and a rearward facing setup.

In the third example embodiment, the first seat cushion mounting arrangement 15 comprises a first mounting base 15c and the second seat cushion mounting arrangement 17 comprises a second mounting base 17c. The seat cushion 4 is arranged to be rotatably attached to the first and second mounting bases 15c, 17c. The first and second mounting bases 15c, 17c are arranged to be movably attached to the first and second seat adjusters 16, 18 respectively. Tilting arrangements (not shown) on each of the first and second mounting bases 15c, 17c ensure that the seat cushion 4 will be arranged in the forward facing seat cushion angle Af and the rearward facing seat cushion angle Ar relative the floor of the vehicle respectively.

Otherwise, the transition of the vehicle seat 2 between the forward facing setup and the rearward facing setup in FIGS. 7A-7D correspond to the transition of the vehicle seat 2 between the forward facing setup and the rearward facing setup in FIGS. 5A-5D.

In the figures, only one vehicle seat 2 has been shown. As mentioned earlier, the vehicle seat arrangement 1 can be used with a number of different seats, such as one or more bucket seats where the seat back 3 is attached to the seat back rotation axle 5, one or more captain's seats where the seat back 3 is attached to the seat back rotation axle 5 and a bench seat where the seat back 3 is attached to the seat back rotation axle 5.

In case of the bucket or captain's seat, the seat back rotation axle 5 runs through the outer and inner armrests of the bucket or captain's seat such that they can rotate independently of each other. The bench seat can be split, with one or more parts being independently adjustable between the forward facing setup and the rearward facing setup.

In all embodiments and variations, the seat back is arranged at an angle of approximately 15° to 25° relative a vertical axis when in the forward facing seat back setup and the rearward facing seat back setup.

Although the disclosure has been illustrated and described in detail in the drawings and foregoing description, such illustration and description are to be considered illustrative or exemplary and the disclosure is not limited to the disclosed embodiments. The vehicle seat arrangement 1 of the disclosure can also be used in a vehicle where the vehicle seat 2 faces a direction other than the vehicle's direction of travel and a direction opposite the vehicle's direction of travel. For instance, the seat can face a direction that is at an angle relative the vehicle's direction of travel. In these cases, forward and rearward are to be understood as a first and second facing setup that are arranged essentially 180° relative each other.

What is claimed is:

1. A vehicle seat for a vehicle that is adjustable between a forward facing setup and a rearward facing setup, the vehicle seat comprising:
a seat back rotation axle;
a seat back comprising a user support side for engaging a user's back and non-user support side opposite the user support side, wherein the seat back is rotatable around the seat back rotation axle between a forward facing seat back setup in which the user support side faces a front end of the vehicle and the non-user support side faces a rear end of the vehicle and a rearward facing seat back setup in which the user support side faces the rear end of the vehicle and the non-user support side faces the front end of the vehicle;
a seat cushion for supporting the user's buttocks, wherein the seat cushion is adjustable between a forward facing seat cushion setup and a rearward facing seat cushion setup, wherein the seat back and the seat cushion are two separate parts that independently move, respectively, between the forward facing seat back setup the rearward facing seat back setup and between the forward facing seat cushion setup and the rearward facing seat cushion setup, and
wherein the seat back rotation axle is fixed in a location in the vehicle during the seat back's rotation between the forward facing seat back setup and the rearward facing seat back setup, and the seat cushion displaces horizontally between a first seat cushion location in which the seat cushion is in the forward facing seat cushion setup and a second seat cushion location in which the seat cushion is in the rearward facing seat cushion setup.

2. The vehicle seat according to claim 1, wherein the seat back comprises a first headrest attached to a first end of the seat back and a second headrest attached to a second end of the seat back opposite the first end, where the second headrest is positioned underneath the seat cushion when the seat back is in the forward facing seat back setup and the first headrest is positioned underneath the seat cushion when the seat back is in the rearward facing seat back setup.

3. The vehicle seat according to claim 1, wherein the seat cushion in both the forward facing seat cushion set up and in the rearward facing seat cushion set up is inclined at a seat cushion angle relative a vehicle floor.

4. The vehicle seat according to claim 1, wherein the seat cushion in the forward facing seat cushion set up is arranged at a forward facing seat cushion angle relative a vehicle floor and the seat cushion in the rearward facing seat cushion set up is arranged at a rearward facing seat cushion angle relative the vehicle floor.

5. The vehicle seat according to claim 1, wherein the user support side of the seat back is vertically symmetric about the seat back rotation axle and/or an upper surface of the seat cushion is horizontally symmetric about a lateral midline thereof.

6. A vehicle seat arrangement having a first bucket or captain's seat and a second bucket or captain's seat each according to claim 1, wherein the first bucket or captain's seat comprises an outer armrest and an inner armrest and the second bucket or captain's seat comprises an outer armrest and an inner armrest, and the seat back rotation axle of each of the first bucket or captain's seat and the second bucket or captain's seat has an axis of rotation that runs through the respective pair of outer and inner armrests such that the seat backs of the first and second bucket or captain's seats rotate independently of each other.

7. The vehicle seat according to claim 1, wherein the vehicle seat is a bench seat.

8. The vehicle seat according to claim 1, wherein the seat back rotation axle is attached to a body of the vehicle.

9. The vehicle seat according to claim 1, wherein the vehicle seat is arranged in a first seating row of the vehicle.

10. The vehicle seat according to claim 1, wherein the vehicle seat is arranged in a second seating row of the vehicle.

11. The vehicle seat according to claim 1, wherein the vehicle seat is arranged in a third seating row of the vehicle.

12. A vehicle comprising the vehicle seat according to claim 1.

13. A vehicle seat for a vehicle that is adjustable between a forward facing setup and a rearward facing setup, the vehicle seat comprising:
- a seat back rotation axle;
- a seat back comprising a user support side for engaging a user's back and non-user support side opposite the user support side, wherein the seat back is rotatable around the seat back rotation axle between a forward facing seat back setup in which the user support side faces a front end of the vehicle and the non-user support side faces a rear end of the vehicle and a rearward facing seat back setup in which the user support side faces the rear end of the vehicle and the non-user support side faces the front end of the vehicle;
- a seat cushion for supporting the user's buttocks, wherein the seat cushion is adjustable between a forward facing seat cushion setup and a rearward facing seat cushion setup, wherein the seat back and the seat cushion are two separate parts that independently move, respectively, between the forward facing seat back setup the rearward facing seat back setup and between the forward facing seat cushion setup and the rearward facing seat cushion setup, and
- wherein the seat back rotation axle displaces horizontally between a first seat back rotation axle location in the vehicle in which the seat back is arranged in the forward facing seat back setup and a second seat back rotation axle location in the vehicle in which the seat back is arranged in the rearward facing seat back setup, and the seat cushion is fixed in a location of the vehicle in both the forward facing seat back setup and the rearward facing seat back setup.

14. The vehicle seat according to claim 13, wherein the seat back comprises a first headrest attached to a first end of the seat back and a second headrest attached to a second end of the seat back opposite the first end, where the second headrest is positioned underneath the seat cushion when the seat back is in the forward facing seat back setup and the first headrest is positioned underneath the seat cushion when the seat back is in the rearward facing seat back setup.

15. The vehicle seat according to claim 13, wherein the seat cushion in both the forward facing seat cushion set up and in the rearward facing seat cushion set up is inclined at a seat cushion angle relative a vehicle floor.

16. The vehicle seat according to claim 13, wherein the seat cushion in the forward facing seat cushion set up is arranged at a forward facing seat cushion angle relative a vehicle floor and the seat cushion in the rearward facing seat cushion set up is arranged at a rearward facing seat cushion angle relative the vehicle floor.

17. The vehicle seat according to claim 13, wherein the user support side of the seat back is vertically symmetric about the seat back rotation axle and/or an upper surface of the seat cushion is horizontally symmetric about a lateral midline thereof.

18. A vehicle seat arrangement having a first bucket or captain's seat and a second bucket or captain's seat each according to claim 13, wherein the first bucket or captain's seat comprises an outer armrest and an inner armrest and the second bucket or captain's seat comprises an outer armrest and an inner armrest, and the seat back rotation axle of each of the first bucket or captain's seat and the second bucket or captain's seat has an axis of rotation that runs through the respective pair of outer and inner armrests such that the seat backs of the first and second bucket or captain's seats rotate independently of each other.

19. The vehicle seat according to claim 13, wherein the seat back rotation axle is attached to a body of the vehicle.

20. A vehicle comprising the vehicle seat according to claim 13.

* * * * *